US012572440B2

(12) United States Patent
Nagarajegowda

(10) Patent No.: US 12,572,440 B2
(45) Date of Patent: Mar. 10, 2026

(54) AUTOMATICALLY DETECTING WORKLOAD TYPE-RELATED INFORMATION IN STORAGE SYSTEMS USING MACHINE LEARNING TECHNIQUES

(71) Applicant: Dell Products L.P., Round Rock, TX (US)

(72) Inventor: Deepak Nagarajegowda, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 1108 days.

(21) Appl. No.: 17/213,958

(22) Filed: Mar. 26, 2021

(65) Prior Publication Data

US 2022/0308976 A1 Sep. 29, 2022

(51) Int. Cl.
*G06F 11/34* (2006.01)
*G06F 11/30* (2006.01)
(Continued)

(52) U.S. Cl.
CPC ...... *G06F 11/3414* (2013.01); *G06F 11/3034* (2013.01); *G06F 11/3075* (2013.01); *G06F 11/3466* (2013.01); *G06F 18/214* (2023.01); *G06F 18/2178* (2023.01); *G06N 20/00* (2019.01)

(58) Field of Classification Search
CPC .............. G06F 11/3414; G06F 11/3034; G06F 11/3075; G06F 11/3466; G06F 18/214;
G06F 18/2178; G06F 11/3409; G06F 11/3485; G06F 18/2163; G06F 18/217;
G06N 20/00; G06N 20/20
See application file for complete search history.

(56) References Cited

U.S. PATENT DOCUMENTS 10,521,124 B1 12/2019 Aharoni et al.
10,754,706 B1 8/2020 Mo et al.
(Continued)

Primary Examiner — David Yi
Assistant Examiner — Nicholas Shine
(74) *Attorney, Agent, or Firm* — Ryan, Mason & Lewis, LLP

(57) ABSTRACT

Methods, apparatus, and processor-readable storage media for automatically detecting workload type-related information in storage systems using machine learning techniques are provided herein. An example computer-implemented method includes designating workload types associated with a storage system by identifying performance-related characteristics associated with each of the workload types; obtaining historical time series data, associated with the storage system, pertaining to multiple performance-related metrics; partitioning the historical time series data into multiple segments based on value levels of the performance-related metrics; generating supervised datasets by associating, for each of the segments, the value levels of the performance-related metrics with a given one of the designated workload types; training a machine learning model using the supervised datasets; detecting workload types associated with input data from the storage system by processing the input data using the machine learning model; and performing automated actions based on the detected workload types.

20 Claims, 13 Drawing Sheets

(51) Int. Cl.
    *G06F 18/21*           (2023.01)
    *G06F 18/214*         (2023.01)
    *G06N 20/00*           (2019.01)

(56)           References Cited

U.S. PATENT DOCUMENTS

| | | | |
|---|---|---|---|
| 10,809,936 B1 * | 10/2020 | Kaushik | G06N 5/04 |
| 11,715,025 B2 * | 8/2023 | Wen | G06F 9/5077 |
| | | | 706/46 |
| 2009/0228499 A1 * | 9/2009 | Schmidtler | G06F 16/24578 |
| 2015/0106578 A1 * | 4/2015 | Warfield | G06F 3/0653 |
| | | | 711/158 |
| 2020/0272356 A1 | 8/2020 | Zhang et al. | |
| 2020/0393981 A1 | 12/2020 | Dutta et al. | |
| 2022/0207444 A1 * | 6/2022 | Bramble | G06Q 10/0639 |
| 2022/0261164 A1 * | 8/2022 | Zhuravlev | G06F 3/0638 |

* cited by examiner

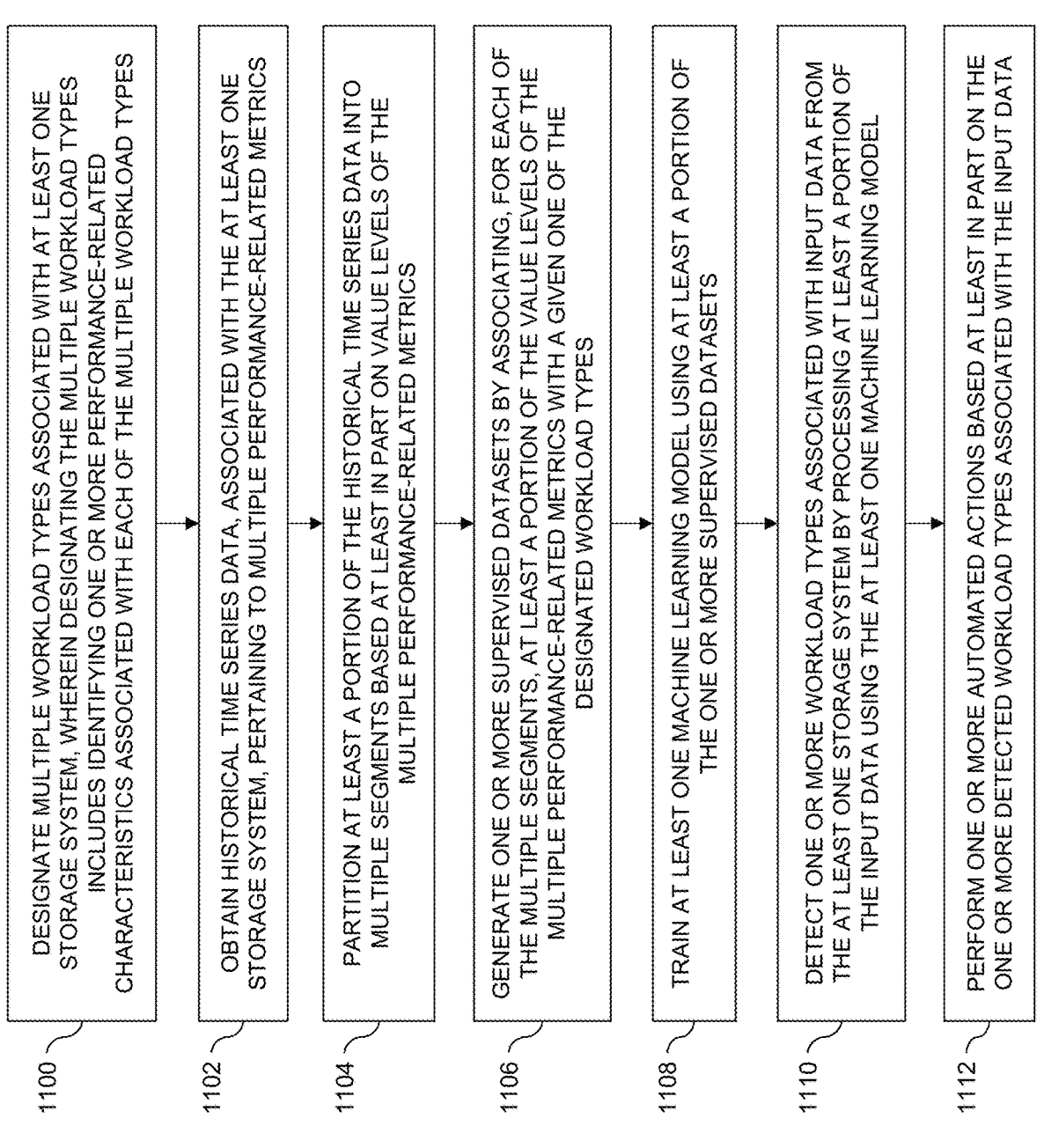

1100 — DESIGNATE MULTIPLE WORKLOAD TYPES ASSOCIATED WITH AT LEAST ONE STORAGE SYSTEM, WHEREIN DESIGNATING THE MULTIPLE WORKLOAD TYPES INCLUDES IDENTIFYING ONE OR MORE PERFORMANCE-RELATED CHARACTERISTICS ASSOCIATED WITH EACH OF THE MULTIPLE WORKLOAD TYPES

1102 — OBTAIN HISTORICAL TIME SERIES DATA, ASSOCIATED WITH THE AT LEAST ONE STORAGE SYSTEM, PERTAINING TO MULTIPLE PERFORMANCE-RELATED METRICS

1104 — PARTITION AT LEAST A PORTION OF THE HISTORICAL TIME SERIES DATA INTO MULTIPLE SEGMENTS BASED AT LEAST IN PART ON VALUE LEVELS OF THE MULTIPLE PERFORMANCE-RELATED METRICS

1106 — GENERATE ONE OR MORE SUPERVISED DATASETS BY ASSOCIATING, FOR EACH OF THE MULTIPLE SEGMENTS, AT LEAST A PORTION OF THE VALUE LEVELS OF THE MULTIPLE PERFORMANCE-RELATED METRICS WITH A GIVEN ONE OF THE DESIGNATED WORKLOAD TYPES

1108 — TRAIN AT LEAST ONE MACHINE LEARNING MODEL USING AT LEAST A PORTION OF THE ONE OR MORE SUPERVISED DATASETS

1110 — DETECT ONE OR MORE WORKLOAD TYPES ASSOCIATED WITH INPUT DATA FROM THE AT LEAST ONE STORAGE SYSTEM BY PROCESSING AT LEAST A PORTION OF THE INPUT DATA USING THE AT LEAST ONE MACHINE LEARNING MODEL

1112 — PERFORM ONE OR MORE AUTOMATED ACTIONS BASED AT LEAST IN PART ON THE ONE OR MORE DETECTED WORKLOAD TYPES ASSOCIATED WITH THE INPUT DATA

FIG. 11

AUTOMATICALLY DETECTING WORKLOAD TYPE-RELATED INFORMATION IN STORAGE SYSTEMS USING MACHINE LEARNING TECHNIQUES

FIELD

The field relates generally to information processing systems, and more particularly to storage in such systems.

BACKGROUND

Storage system providers are under increasing pressure to provide infrastructure that is responsive to the application workloads of enterprises, organizations and/or other users. Understanding workloads and the characteristics thereof is important to creating responsive storage infrastructure that can satisfy a variety of demands being placed on storage systems by their users.

Different workload characteristics will demand different things from storage systems. Additionally, for example, most data centers have a variety of workloads that need to be supported. However, conventional storage management techniques cannot provide sufficient insight into the input/output (IO) characteristics of each workload in a given environment. The result of such disadvantageous techniques includes reduced performance and/or the wasting of resources, possibly due to data centers obtaining multiple storage systems in an attempt to distribute workloads, or data centers overbuying on a single storage system in an attempt to support multiple workloads simultaneously.

SUMMARY

Illustrative embodiments of the disclosure provide techniques for automatically detecting workload type-related information in storage systems using machine learning techniques. An exemplary computer-implemented method includes designating multiple workload types associated with at least one storage system, wherein designating the multiple workload types comprises identifying one or more performance-related characteristics associated with each of the multiple workload types. The method also includes obtaining historical time series data, associated with the at least one storage system, pertaining to multiple performance-related metrics, partitioning at least a portion of the historical time series data into multiple segments based at least in part on value levels of the multiple performance-related metrics, and generating one or more supervised datasets by associating, for each of the multiple segments, at least a portion of the value levels of the multiple performance-related metrics with a given one of the designated workload types. Further, the method additionally includes training at least one machine learning model using at least a portion of the one or more supervised datasets, detecting one or more workload types associated with input data from the at least one storage system by processing at least a portion of the input data using the at least one machine learning model, and performing one or more automated actions based at least in part on the one or more detected workload types associated with the input data.

Illustrative embodiments can provide significant advantages relative to conventional storage management techniques. For example, problems associated with reduced performance and/or the wasting of resources are overcome in one or more embodiments through automatically detect-ing workload type-related information in storage systems using machine learning techniques.

These and other illustrative embodiments described herein include, without limitation, methods, apparatus, systems, and computer program products comprising processor-readable storage media.

BRIEF DESCRIPTION OF THE DRAWINGS

FIG. 11 is a flow diagram of a process for automatically detecting workload type-related information in storage systems using machine learning techniques in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
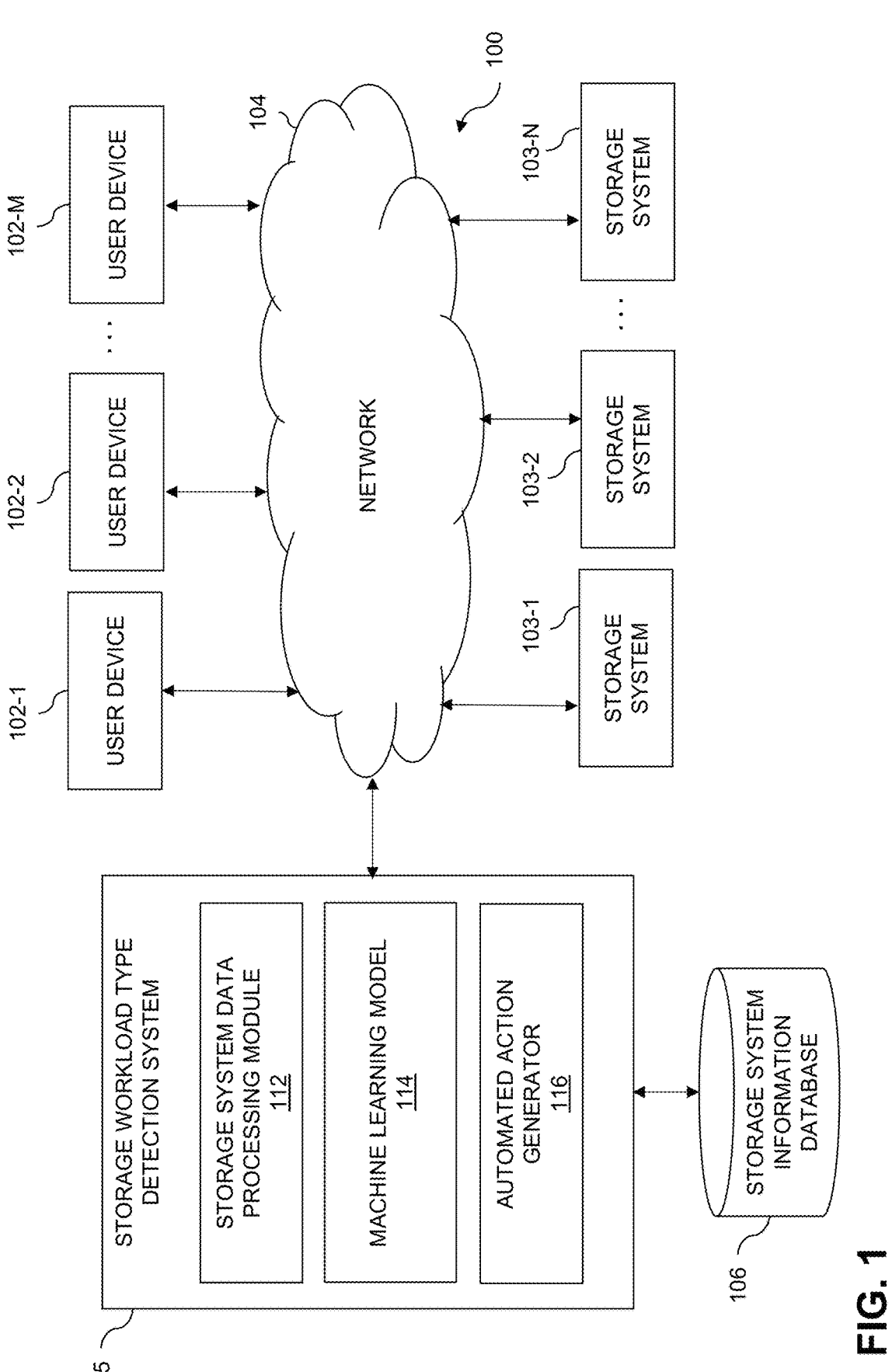
FIG. 1 shows an information processing system configured for automatically detecting workload type-related information in storage systems using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102, and a plurality of storage systems 103-1, 103-2, . . . 103-N, collectively referred to herein as storage systems 103. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is storage workload type detection system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The storage systems 103 may comprise, for example, storage objects such as pools, file systems, logical storage volumes (e.g., logical units or LUNs), etc. The storage systems 103 in some embodiments comprise respective storage systems associated with a particular company, organization or other enterprise.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, storage workload type detection system 105 can have an associated storage system information database 106 configured to store data pertaining to storage systems 103 and/or one or more storage objects thereof, which comprise, for example, time series data and other performance-related data associated with storage systems 103 and one or more storage objects and/or other components thereof.

The storage system information database 106 in the present embodiment is implemented using one or more storage systems associated with storage workload type detection system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with storage workload type detection system 105 are one or more input-output devices, which illustratively comprise keyboards, displays or other types of input-output devices in any combination. Such input-output devices can be used, for example, to support one or more user interfaces to storage workload type detection system 105, as well as to support communication between storage workload type detection system 105 and other related systems and devices not explicitly shown.

Additionally, storage workload type detection system 105 in the FIG. 1 embodiment is assumed to be implemented using at least one processing device. Each such processing device generally comprises at least one processor and an associated memory, and implements one or more functional modules for controlling certain features of storage workload type detection system 105.

More particularly, storage workload type detection system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows storage workload type detection system 105 to communicate over the network 104 with the user devices 102 and/or storage systems 103, and illustratively comprises one or more conventional transceivers.

The storage workload type detection system 105 further comprises storage system data processing module 112, machine learning model 114, and automated action generator 116.

It is to be appreciated that this particular arrangement of elements 112, 114 and 116 illustrated in the storage workload type detection system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically detecting workload type-related information in storage systems using machine learning techniques involving storage systems 103 and user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, storage workload type detection system 105 and storage system information database 106 can be implemented in at least one of the storage systems 103 and/or in an associated management server or set of servers.

An exemplary process utilizing elements 112, 114 and 116 of an example storage workload type detection system 105 in computer network 100 will be described in more detail with reference to the flow diagram of FIG. 11.

Accordingly, at least one embodiment includes automatically detecting workload type-related information in storage systems using machine learning techniques. Such detected workload type-related information can subsequently be used, for example, to facilitate building improved and/or more efficient information technology infrastructures, to assist users and/or customers with purchasing decisions regarding what type of storage systems are most suitable to their use context, and/or to balance workloads within storage systems to improve and/or streamline performance.

As used herein, a workload can include a set of IO characteristics running through a group of virtual machines that interface with network and/or storage infrastructures. For example, an application workload may interact with a web server, one or more database servers, as well as one or more other application servers. In one or more embodiments, the combination of all such servers and the associated networked storage makes up that application's workload. Another example can include a virtual desktop infrastructure (VDI), which can be comprised of multiple physical hosts and many virtual machines.

As also detailed herein, workloads commonly encompass unique characteristics, and each such characteristic can potentially impact storage latency, input-output operations per second (IOPS), throughput, etc. In one or more embodiments, such workload characteristics can include IO mix (e.g., how much of the workload involves read operations versus write operations?), IO type (e.g., does the workload write and/or read data sequentially or randomly?), data/metadata mix (e.g., does the workload read and/or manipulate metadata more than the workload reads and/or manipulates actual data?), block and/or file size distribution (e.g., does the workload write in small or large blocks?), data efficiency appropriateness (e.g., does the workload have redundant or compressible data so that functions such as deduplication and compression work effectively?), whether the workload is prone to one or more specific hot spots, changes to one or more characteristics over a given time period, etc. As used herein a hot spot refers to a situation wherein a particular workload requiring more computer resources (e.g., more central processing unit (CPU) cores, more memory, higher network bandwidth, etc.) does not get those resources allocated thereto. Due to this, the workload suffers performance degradation and can, in turn, put more stress on the system.

One or more embodiments include determining and/or identifying the workload type of a given workload using a defined algorithm to scan time series data at one or more granular level-based partitions (e.g., 5 second intervals to multi-hour intervals) to detect workload information in (approximately) real-time and/or in batch mode. Such an embodiment can also include using storage metrics data from across at least a portion of the data flow within at least one given storage array, which can include storage metrics data at various component levels (e.g., disk level, port level, etc.) and/or at storage objects that are allocated to hosts and/or virtual machines, etc.

As further detailed herein, at least one embodiment includes level setting one or more workload types in storage systems, with respect to workload characteristics and/or workload scope. For example, in one or more embodiments, workloads can be classified into one of multiple workload categories, such as batch workloads, transactional workloads, analytic workloads, high-performance workloads, database workloads, etc. By way of illustration, batch workloads can encompass characteristics including processing large volumes of data, and transactional workloads can encompass characteristics including automation of enterprise processes such as billing and order processing, and/or processing a large number of short, discrete, atomic transactions. By way merely of example, an emphasis of online transaction processing (OLTP) systems is high throughput (for example, as measured by transactions per second).

Analytic workloads can encompass characteristics including extreme data volumes, complex computations, high row cardinality (i.e., high number of rows), high row width and/or row size, wherein analytics processing can be characterized by fewer users (e.g., enterprise analysts rather than customers and point-of-sale operators) submitting fewer requests, but submitting queries that can be complex and resource-intensive. Response time for such processing can be commonly measured in tens to hundreds of seconds, for example.

Also, high-performance workloads can encompass characteristics including heavy and/or complex computation, and database workloads can encompass characteristics including highly targeted actions (e.g., utilizing a limited number of tables and rows, touching only necessary database objects and columns, with a limited amount of heavy and/or complex computations).

At least one embodiment additionally includes determining how, when, and where to extract performance-related telemetry data in at least one storage array. As used herein, a storage array can refer to a complex system containing multiple logical storage objects, ports, hosts, directors, storage networks, multi-core CPUs, disks, etc. Further, workload profiling, in accordance with one or more embodiments, can be based at least in part on workload information that varies over time.

Figure 2:
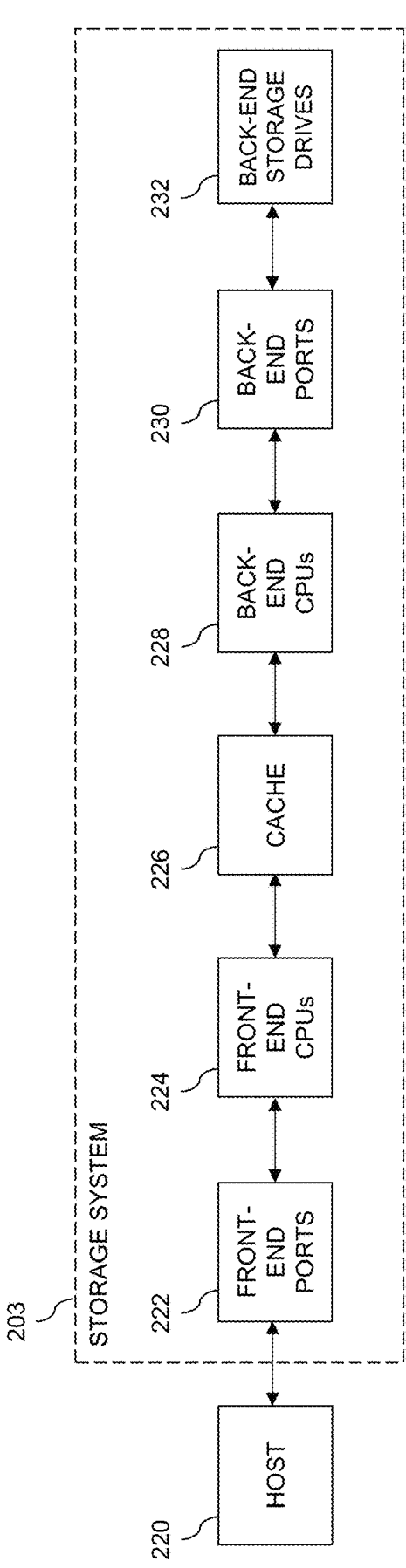
FIG. 2 shows an example data flow in connection with a storage system in an illustrative embodiment.

Accordingly, one or more embodiments include determining and/or understanding the data flow in connection with a given storage system (e.g., storage array). For example, FIG. 2 shows an example data flow in connection with a storage system in an illustrative embodiment. By way of illustration, FIG. 2 depicts host 220 sending an IO request to storage system 203 (which includes one or more front-end ports 222, one or more front-end CPUs 224, cache 226, one or more back-end CPUs 228, one or more back-end ports 230, and one or more back-end storage drives 232). By way of example, in such an embodiment, host 220 can include a computer device and/or a user using a computer device, sending a data request to storage system 203. One or more front-end ports 222 (e.g., part of a director) receive the IO request from host 220, and interact with one or more front-end CPUs 224 in an attempt to fulfill the IO request through cache 226. If the IO request cannot be fulfilled through cache 226, then the IO request is sent to one or more back-end CPUs 228, and, via use of one or more back-end ports 230, the IO request is fulfilled via one or more back-end storage drives 232 and sent back to host 220.

Accordingly, to determine and/or identify the workload type (of a given workload), at least one embodiment includes considering the entire data flow in connection with a storage system. As such the hardware components that are encompassed within such a data flow, and the performance-related telemetry data of each such hardware component, can play a role in determining and/or identifying the workload type.

Additionally, one or more embodiments include making one or more determinations via performing data analysis using performance telemetry data associated with one or more components within a data flow in connection with a given storage system. By way of example, such determinations can include determining that a storage array is overloaded, determining that a high-end workload is being processed on a low-end storage array, determining that latency increases although IOPS increases at the same time, determining that a storage array is under-loaded, determining that a low-end workload is being processed on a high-end storage array, determining that latency decreases although IOPS decreases at the same time, etc.

For instance, batch workloads can correspond with high IOPS, high bandwidth, low percentages of read hits (in connection with a cache), high CPU utilization over a given temporal duration, etc. Additionally, transactional workloads can correspond with low IOPS, low bandwidth, high percentages of read hits (in connection with a cache), low CPU utilization, etc. Also, analytic workloads can correspond with high CPU utilization, high bandwidth and cyclical high IOPS, high-performance workloads can correspond with high CPU utilization, high IOPS, high latency etc., and database workloads can correspond with low CPU utilization, low IOPS, etc.

Accordingly, as detailed herein, each workload can have its own storage metrics characteristics (and there can be some metrics that may overlap across workloads and/or workload types), and at least one embodiment includes determining the workload type of a given workload using performance telemetry data representative of and/or related to such storage metrics characteristics.

Further, one or more embodiments include selecting one or more statistically significant features from the obtained and/or processed telemetry data to be used in determine the workload type. As noted above (e.g., in connection with FIG. 2), each category of object can have one or more metrics associated therewith. For example, front-end system components (e.g., front-end ports 222 and front-end CPUs 224 in FIG. 2) can be associated with metrics including percentage read, bandwidth, latency, CPU percentage, IO size, IOPS, queue, virtual volume latency, etc., and front-end storage objects can be associated with metrics including percentage read, bandwidth, latency, CPU percentage, IO size, IOPS, queue, virtual volume latency, etc. Also, files (related to storage objects) can be associated with metrics including percentage read, bandwidth, IO size, IOPS, etc., and blocks (related to storage objects) can be associated with metrics including percentage read, bandwidth, latency, CPU percentage, IO size, IOPS, queue, etc. Back-end storage objects can be associated with metrics including percentage read, bandwidth, latency, CPU percentage, IO size, IOPS, queue, virtual volume latency, etc., and back-end system components (e.g., back-end CPUs 228 and back-end ports

230 in FIG. 2) can be associated with metrics including percentage read, bandwidth, latency, CPU percentage, IO size, IOPS, queue, virtual volume latency, etc. Additionally, components such as a front-end ethernet (e.g., for each front-end port 222) can be associated with metrics including packets, bandwidth, etc., a front-end fibre channel (e.g., for each front-end port 222) can be associated with metrics including requests, bandwidth, etc., and a front-end Internet small computer systems interface (iSCSI) (e.g., for each front-end port 222) can be associated with metrics including requests, bandwidth, etc. Also, additional components such as a system cache (e.g., cache 226 in FIG. 2) can be associated with metrics including percentage read hits, percentage write hits, percentage free, percentage of dirty data (i.e., the percentage of data that is not yet saved but will be saved at a later time), percentage of clean data, etc., a back-end ethernet (e.g., for each back-end port 230) can be associated with metrics including packets, bandwidth, etc., a back-end fibre channel (e.g., for each back-end port 230) can be associated with metrics including requests, bandwidth, etc., a back-end iSCSI (e.g., for each back-end port 230) can be associated with metrics including requests, bandwidth, etc., and a disk (e.g., within storage system 203) can be associated with metrics including percentage read, bandwidth, IOPS, etc.

In at least one embodiment, time series metric data are partitioned, bucketed (also referred to herein as categorized), labeled, and used for training at least one machine learning model. Subsequently, such an embodiment includes detecting workload type of at least one given workload by processing input storage system telemetry data using the at least one trained machine learning model. Additionally, in at least one embodiment, one or more algorithms can be used to train the machine learning model. For example, in such an embodiment, the machine learning model can comprise a random forest model, and the model can be trained using at least a portion of the partitioned and/or labeled time series metric data in conjunction with at least one random forest classifier. Additionally or alternatively, in such an embodiment, the machine learning model can comprise a gradient boosting model, and the model can be trained using at least a portion of the partitioned and/or labeled time series metric data in conjunction with gradient boosted trees. In one or more embodiments, the machine learning model (e.g., random forest model, gradient boosting model, etc.) can be trained on partial or entire training datasets (e.g., partitioned and/or labeled time series metric data) and can be tested and/or executed on partial or entire input datasets (e.g., input storage system telemetry data).

As noted above, one or move embodiments includes processing storage data (e.g., storage system telemetry data) into storage-specific buckets using a set of algorithmic steps. In a first step, historical time series data are extracted. For example, CPU utilization segments can be partitioned based on one or more ranges (e.g., 0-33%, 34%-66%, and 67%-100%). Such partitioning can be carried out, for example using at least one algorithm such as described as follows.

For a given set of historical time series data, one or more embodiments include designating and/or annotating the starting time-stamp as "t1" and designating and/or annotating the initial value of the parameter (e.g., CPU Utilization) as "c1." Such an embodiment also includes sliding the window forward by a predetermined time period (e.g., five seconds) and calculating the moving average. Additionally or alternatively, at least one embodiment can include continuing to slide the window until the calculated moving average exceeds a given threshold amount (for example, if the "c1" value is less than 33% (of the total value of the given variable), then the window can stop when the moving average touches 33%). The time stamp(s) corresponding to the moment(s) when the window is stopped can be designated and/or annotated as "t2."

Further, one or more embodiments include partitioning the time series data between "t1" and "t2," and tagging and/or annotating each partition with a unique identifier (ID). At least portions of the above-detailed partitioning algorithm can be repeated with starting point "t2" for at least a portion of the remaining time series data. Additionally, at least portions of the above-detailed partitioning algorithm can be repeated for one or more additional storage metrics. After applying the partitioning algorithm, portions of time series data will be divided and/or organized into sections/partitions.

By way merely of example, consider a use case wherein a first level includes a CPU utilization metric and a second level includes a separate storage-related metric. Such an example embodiment includes partitioning time series data pertaining to each metric based on some value-based designation (e.g., high value segments, medium value segments, and low value segments), and putting and/or categorizing each of the partitioned segments from the first level metric and the second level metric into respective buckets (e.g., a first bucket for high value segments, a second bucket for medium value segments, and a third bucket for low value segments). At this point, the example embodiment includes comparing, within the various buckets, the partitioned first level metric segments with the partitioned second level metric segments, and retaining matching segments (e.g., segments that are similar beyond a threshold amount) in the original buckets, while moving unmatching or dissimilar segments into one or more new buckets. This process can then be repeated, if desired, with one or more additional storage metrics. Accordingly, in one or more such embodiments, all matching segments (e.g., segments that are similar beyond a threshold amount) across multiple storage-related metrics will be placed and/or categorized into respective buckets for further processing (e.g., for use in training a machine learning model).

In such an embodiment, each bucket represents a unique type of workload (e.g., an analytics workload, a batch workload, a high-performance computing workload, a transaction workload, a database workload, etc. For each type of workload, at least one embodiment includes building one or more supervised datasets. Such supervised labeled datasets, in one or more embodiments, are then processed using a machine learning multi-class classifier algorithm to train and/or generate a machine learning model. Subsequently, at least one embodiment includes classifying input storage system data using the machine learning model.

Accordingly, in such an embodiment, a storage system telemetry data stream (e.g., data entries taken every five seconds or some other predetermined time interval) is processed by the machine learning model, which generates an output. In an example embodiment, the machine learning model outputs a determination that particular storage objects of the given storage system are used for certain types of workloads (e.g., a first storage object and a second storage object are used mainly for database workloads, whereas a third storage object is used for batch workload types).

As detailed herein, historical time series data (e.g., storage system performance-related telemetry data) from a given time period (e.g., at least days of data) is utilized to generate and/or train a workload type detection machine learning model. Accordingly, at least one example embodiment includes obtaining and/or extracting performance-related telemetry data (e.g., not just IO data, but also network data, host-related data, virtual machine data, cache data, etc.) for various storage objects and/or storage systems across multiple users and/or enterprises. By doing this, such an embodiment includes gathering data from different types of storage products and multiple models that may have been subjected to different types of workloads. By way merely of example, one or more embodiments can include utilizing all available data (within at least one given time period) for every storage object of a given storage system (e.g., an array) to detect and/or determine workload type.

Figure 3:
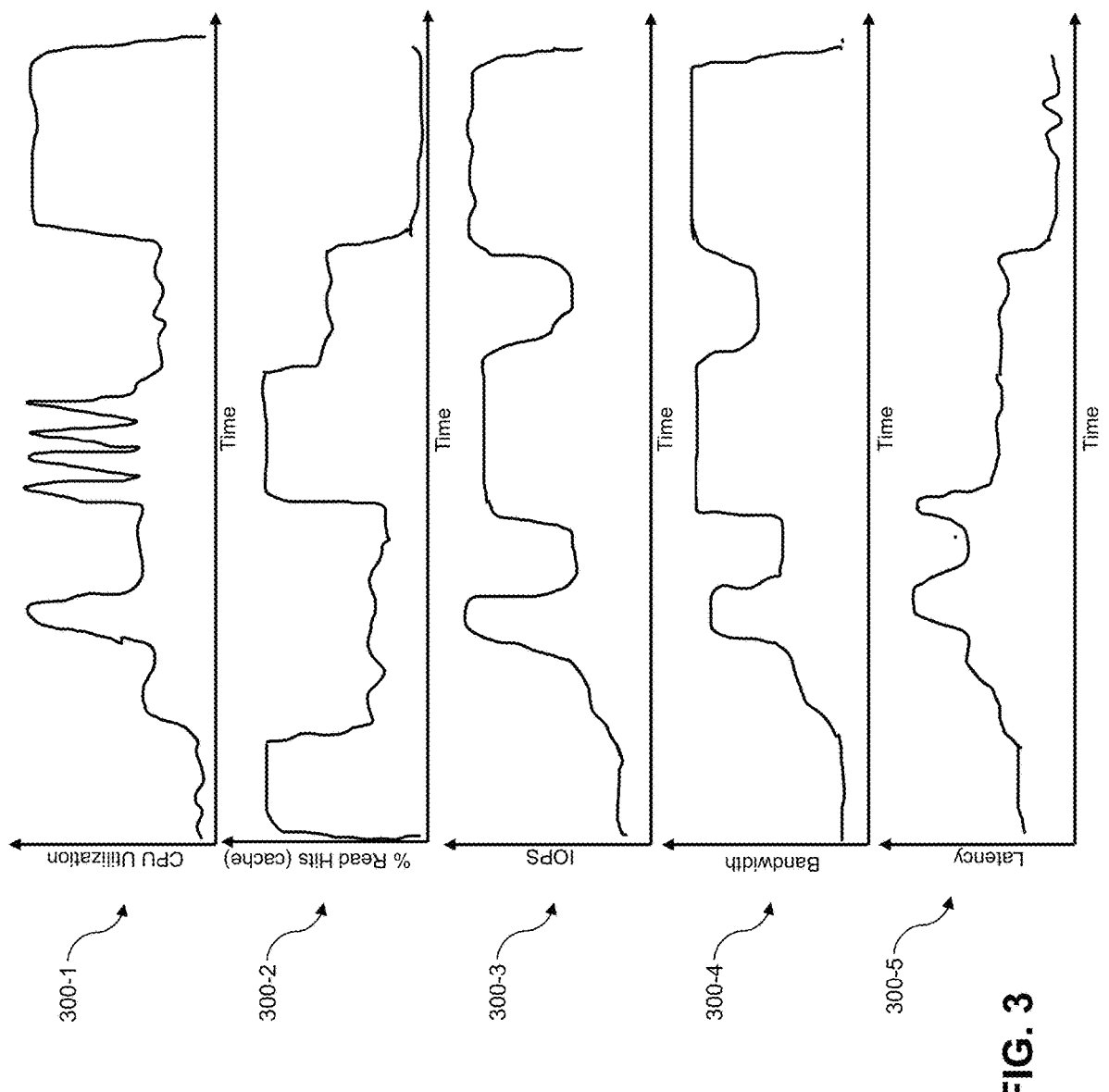
FIG. 3 shows a set of example graphs pertaining to multiple metrics in connection with a storage system in an illustrative embodiment.

FIG. 3 shows a set of example graphs pertaining to multiple metrics in connection with a storage system in an illustrative embodiment. Specifically, FIG. 3 depicts graph 300-1 pertaining to time series data for CPU utilization, graph 300-2 pertaining to time series data for percentage of read hits (in cache), graph 300-3 pertaining to time series data for IOPS, graph 300-4 pertaining to time series data for bandwidth, and graph 300-5 pertaining to time series data for latency. Accordingly, as detailed herein, one or more embodiments include processing metric data into storage-specific buckets using customer algorithmic steps. In one example step, as depicted in FIG. 3, historical time series data are extracted.

Figure 4:
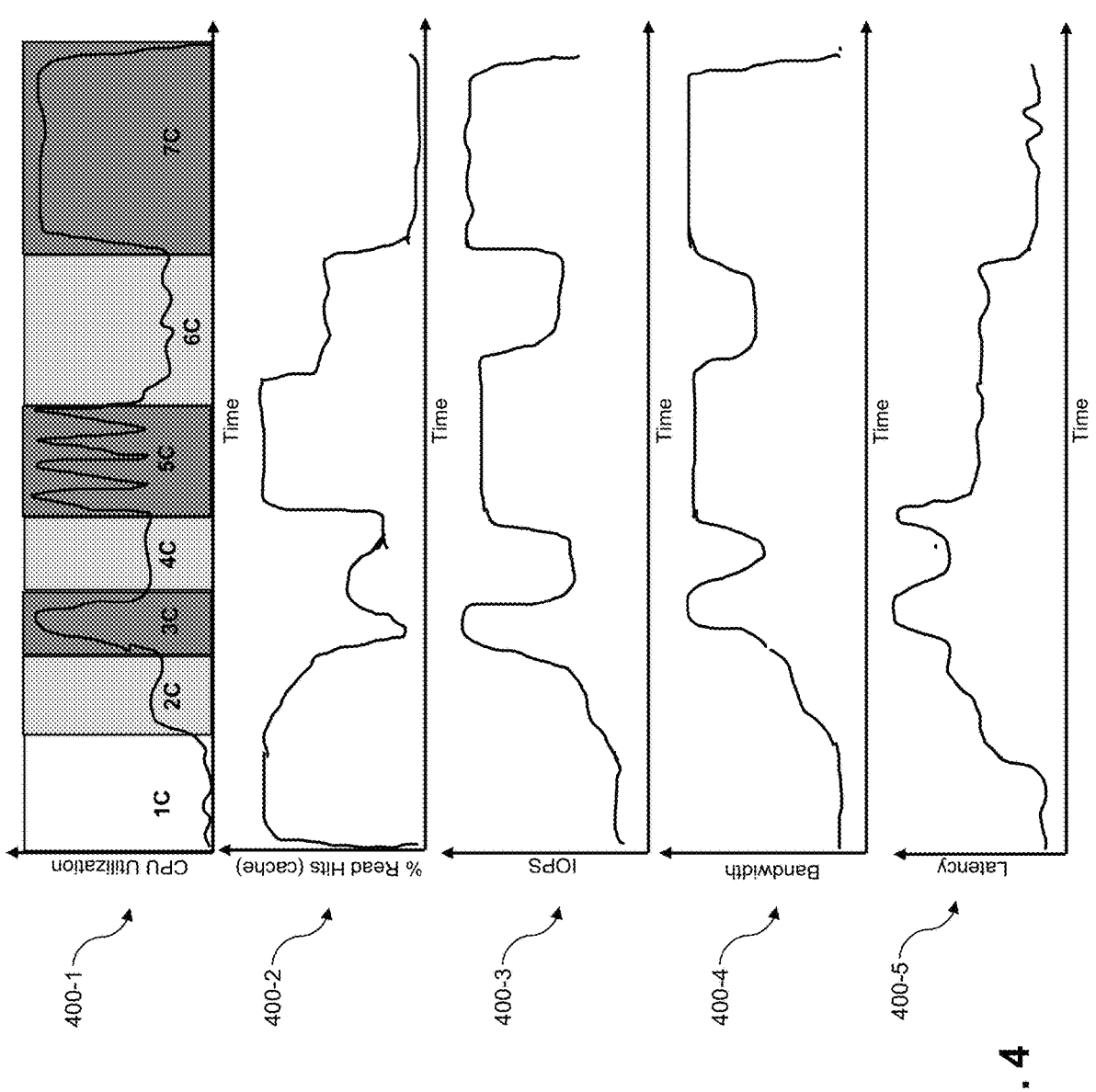
FIG. 4 shows partitioning of one graph from a set of example graphs pertaining to multiple metrics in connection with a storage system in an illustrative embodiment.

FIG. 4 shows partitioning of one graph from the set of example graphs pertaining to multiple metrics in connection with a storage system in an illustrative embodiment. FIG. 4 depicts graphs 400-1, 400-2, 400-3, 400-4 and 400-5 (the same graphs as depicted in FIG. 3), and specifically, FIG. 4 depicts the partitioning of graph 400-1 (pertaining to CPU utilization) into multiple segments based on predefined value ranges (e.g., 0-33%, 34%-66%, 67%-100%). In at least one embodiment, such partitioning can be carried out using the following algorithm.

In a first step of the algorithm, for the given historical time series data (e.g., the data in graph 400-1), the starting timestamp is noted as t1 and the initial value of the parameter (CPU utilization in the FIG. 4 example) is noted as c1. Subsequently, sliding the window forward by a predetermined time period (e.g., five seconds), the algorithm includes calculating the moving average. The algorithm further includes continuing to slide the window forward until the moving average exceeds a given threshold value (e.g., 33% or 66%). For example, if c1 is less than 33%, then the window stops when the moving average touches 33%. The timestamp at this point is noted as t2. Subsequently, the algorithm includes partitioning and/or slicing the time series data between t1 and t2, and tagging each partition with a unique identifier (ID). In the example embodiment depicted in FIG. 4, the partitions are tagged as 1C, 2C, 3C, 4C, 5C, 6C and 7C. The above-noted algorithm steps are then repeated with starting point t2 for the remaining time series data.

Figure 5:
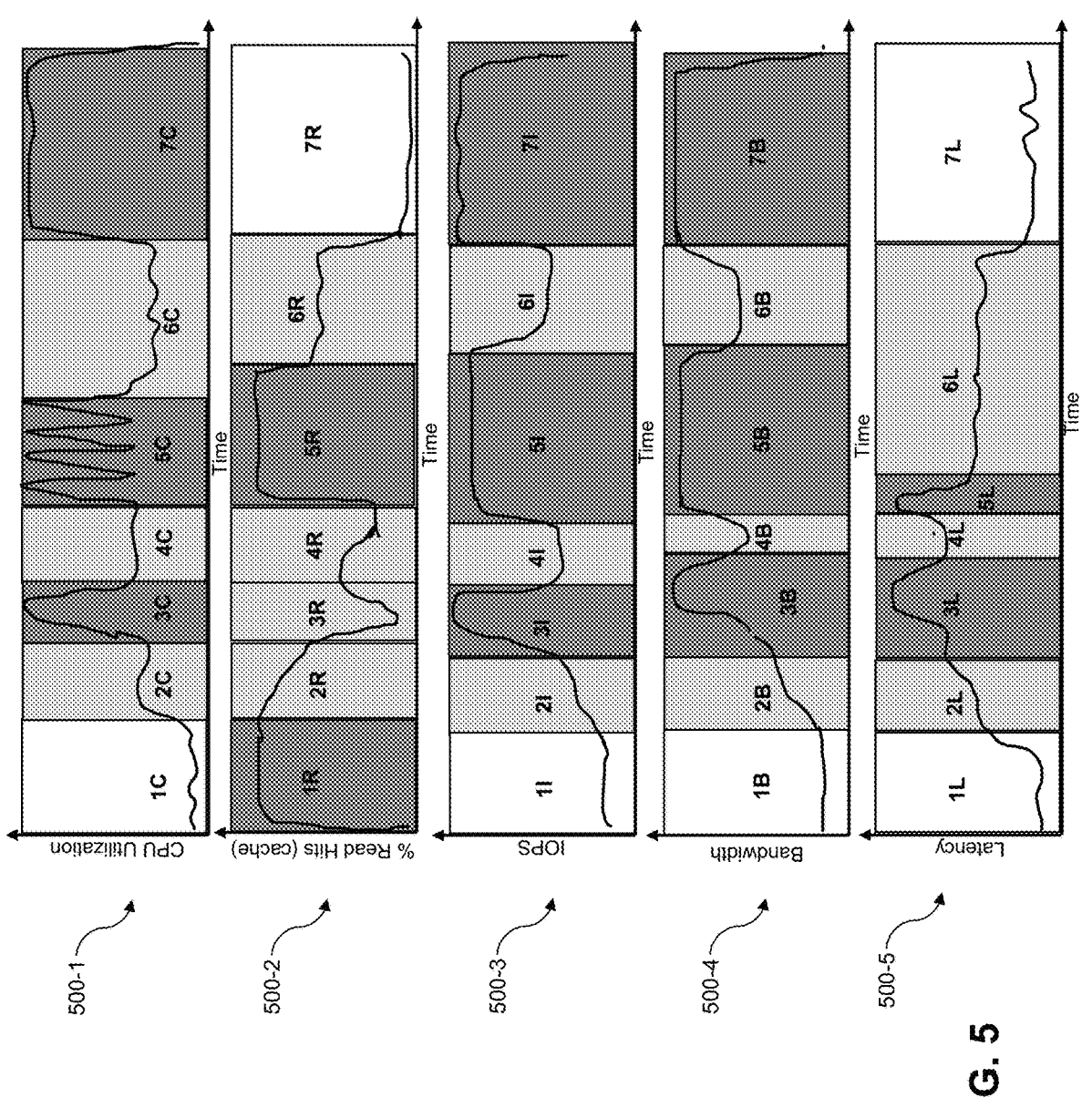
FIG. 5 shows partitioning of the remaining graphs from the set of example graphs pertaining to multiple metrics in connection with a storage system in an illustrative embodiment.

FIG. 5 shows partitioning of the remaining graphs from the set of example graphs pertaining to multiple metrics in connection with a storage system in an illustrative embodiment. By way of illustration, FIG. 5 depicts the outcome of repeating the above-noted partitioning algorithm, as detailed in connection with FIG. 4, across all of the graphs (500-1, 500-2, 500-3, 500-4 and 500-5) for the remaining storage system metrics.

Figure 6:
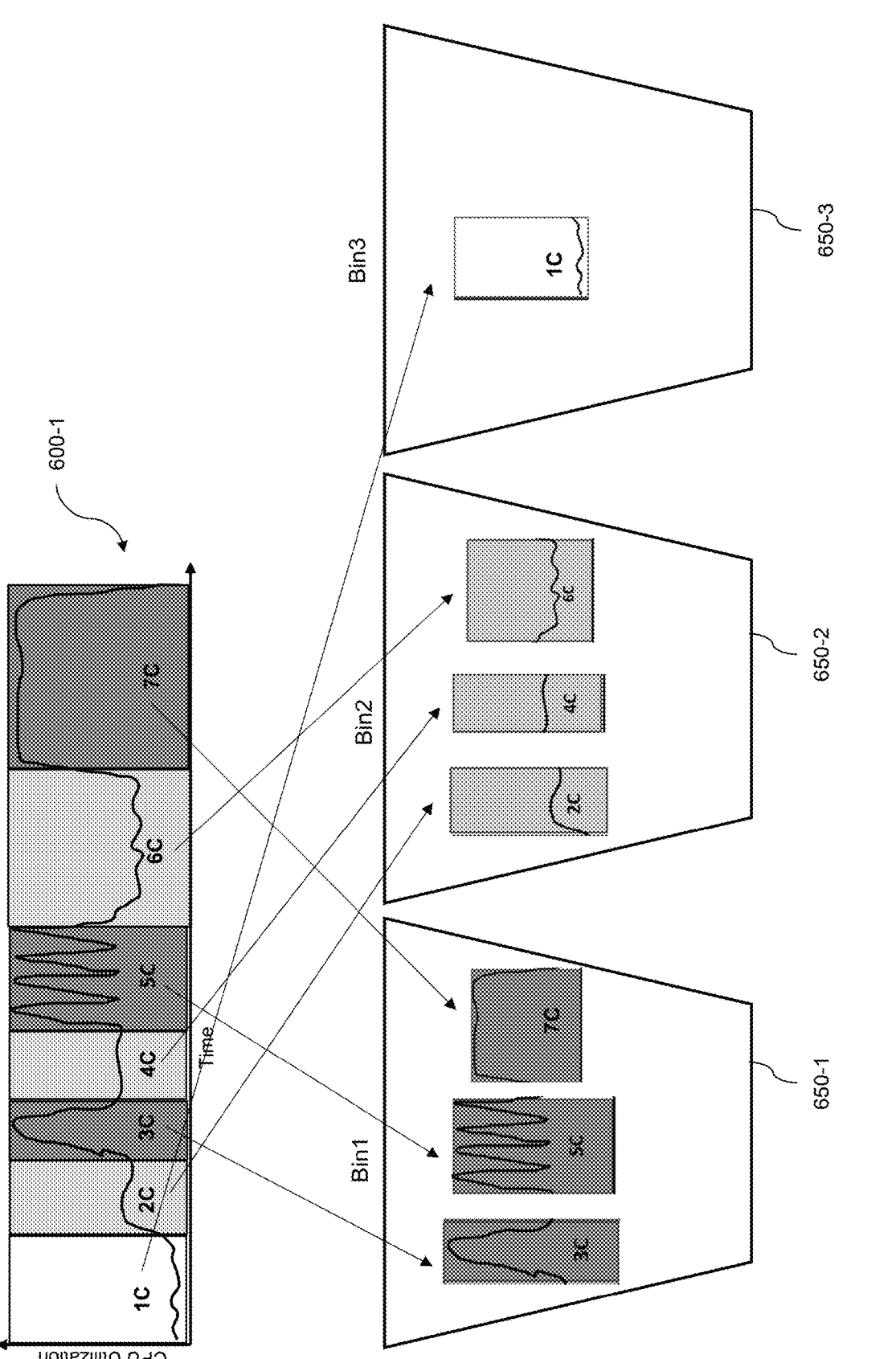
FIG. 6 shows an example bucketing process using the partitioned graph data from a first of the example graphs pertaining to multiple metrics in connection with a storage system in an illustrative embodiment.

FIG. 6 shows an example bucketing process using the partitioned graph data from a first of the example graphs pertaining to multiple metrics in connection with a storage system in an illustrative embodiment. Specifically, FIG. 6 depicts partitioned graph 600-1, pertaining to the CPU utilization metric, being processed as part of a bucketing process. In this step, each of the partitioned segments is put into a particular bucket or bin based on one or more value-based parameters. As shown in FIG. 6, segments 3C, 5C and 7C are put into Bin1 650-1, segments 2C, 4C and 6C are put into Bin2 650-2, and segment 1C is put into Bin3 650-3.

Figure 7:
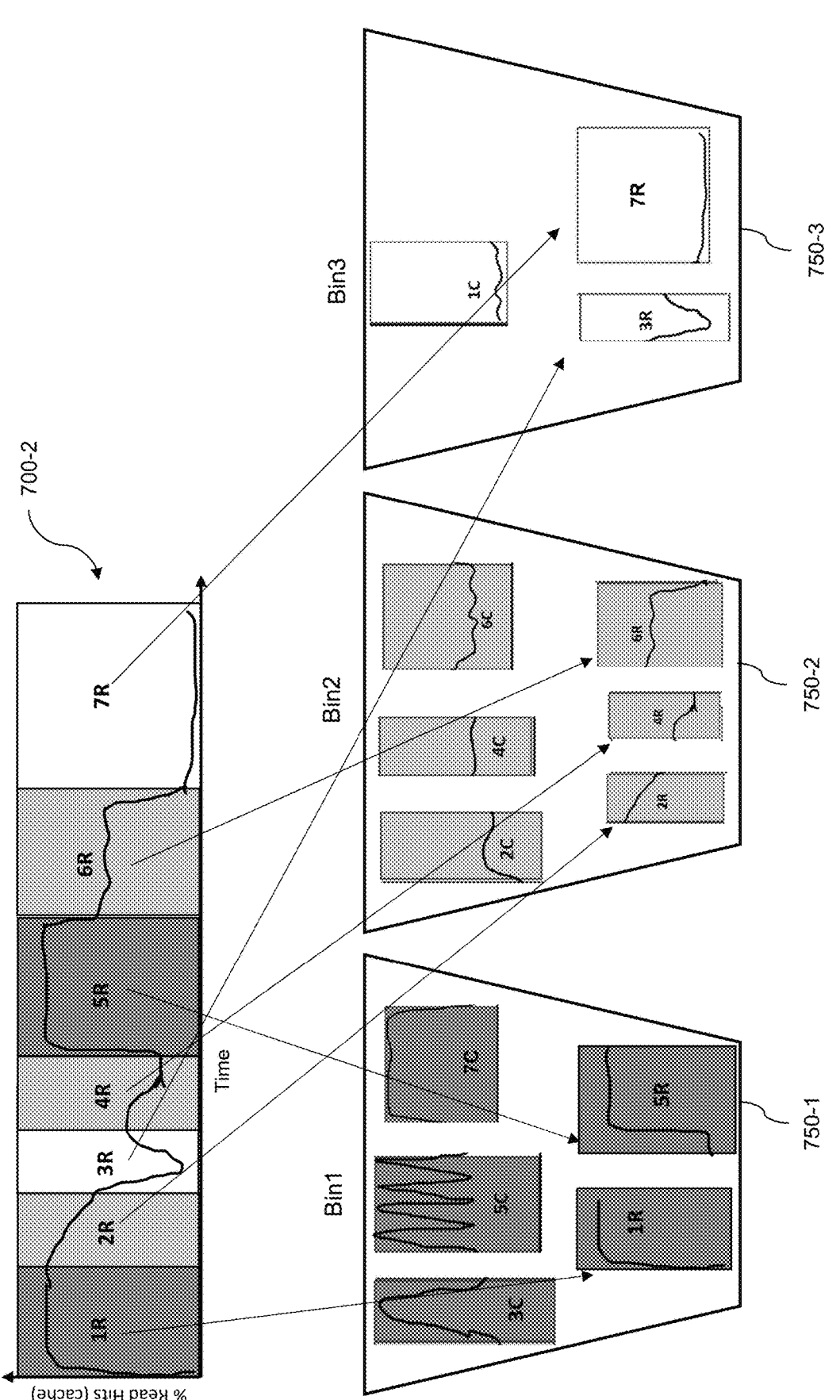
FIG. 7 shows an example bucketing process using the partitioned graph data from a second of the example graphs pertaining to multiple metrics in connection with a storage system in an illustrative embodiment.

FIG. 7 shows an example bucketing process using the partitioned graph data from a second of the example graphs pertaining to multiple metrics in connection with a storage system in an illustrative embodiment. Specifically, FIG. 7 illustrates continuing the bucketing process depicted in FIG. 6 using the next storage metric graph (e.g., 700-2). As illustrated in FIG. 7, various segments of partitioned graph 700-2 are put into Bin1 750-1, Bin2 750-2, and Bin3 750-3 using the same one or more value-based parameters used in connection with the FIG. 6 embodiment.

Figure 8:
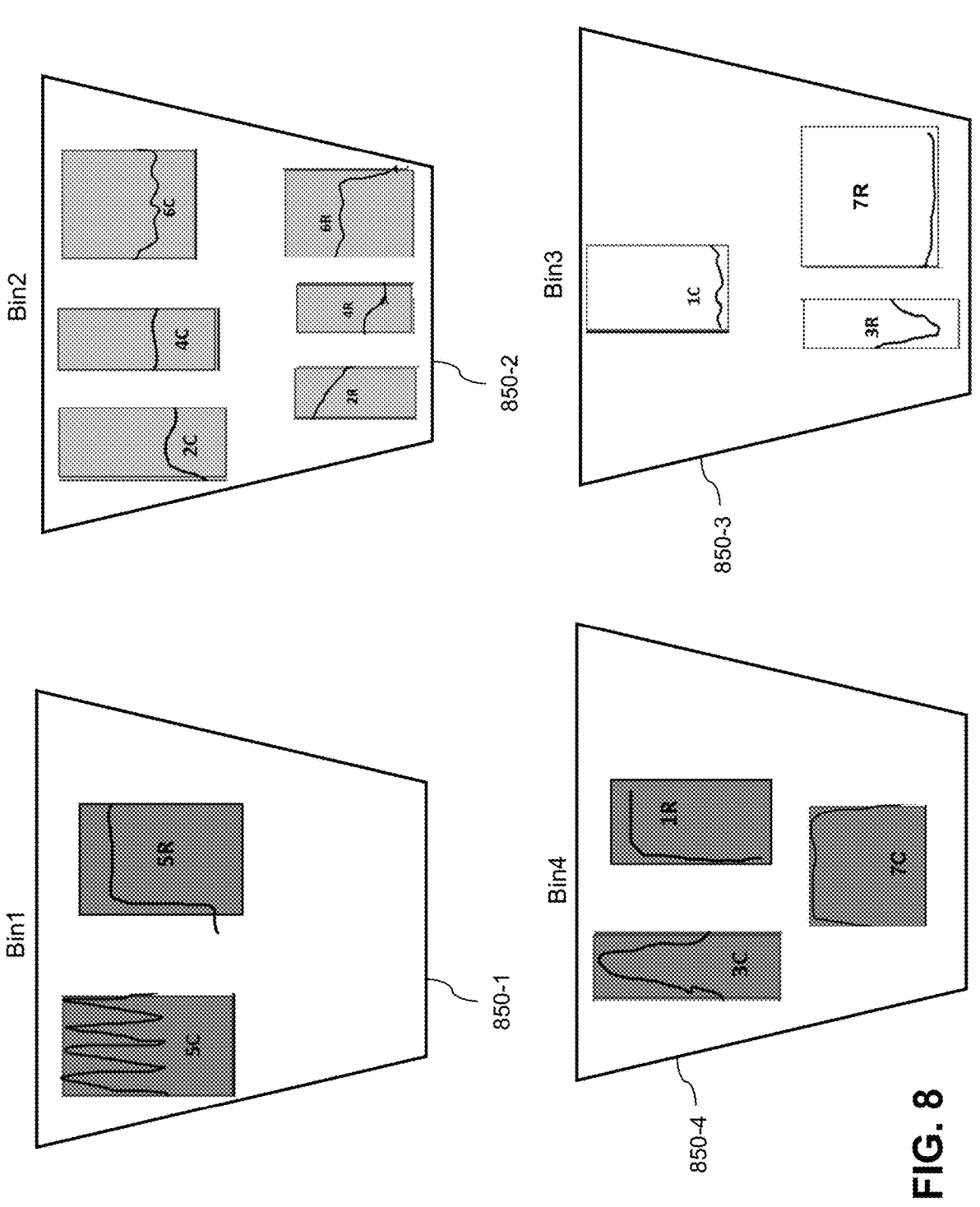
FIG. 8 shows a comparison step of the example bucketing process in an illustrative embodiment.

FIG. 8 shows a comparison step of the example bucketing process in an illustrative embodiment. Specifically, subsequent to the actions carried out in connection with FIG. 6 and FIG. 7, FIG. 8 depicts Bin1 850-1, Bin2 850-2, and Bin3 850-3, each with partitioned graph segments from a first storage system metric (CPU utilization) and/or a second storage system metric (percentage of read hits). At this point, one or more embodiments include comparing the partitioned graph segments from the first storage system metric with the partitioned graph segments from the second storage system metric, retaining similar and/or matching segments within each bucket or bin (for example, segments 5C and 5R are retained in Bin1 850-1), and moving dissimilar and/or unmatching segments into a new bin (i.e., Bin4 850-4 in FIG. 8).

By way of illustration, FIG. 7 shows Bin1 750-1 containing segments 5C, 5R, 3C, 7C and 1R. In this example embodiment, matching segments are determined (based, for example, on temporal information) to be 5C and 5R, which are retained in Bin1 850-1 in FIG. 8, while unmatching segments (3C, 7C and 1R) are put into a new bin (i.e., Bin4 850-4).

Figure 9:
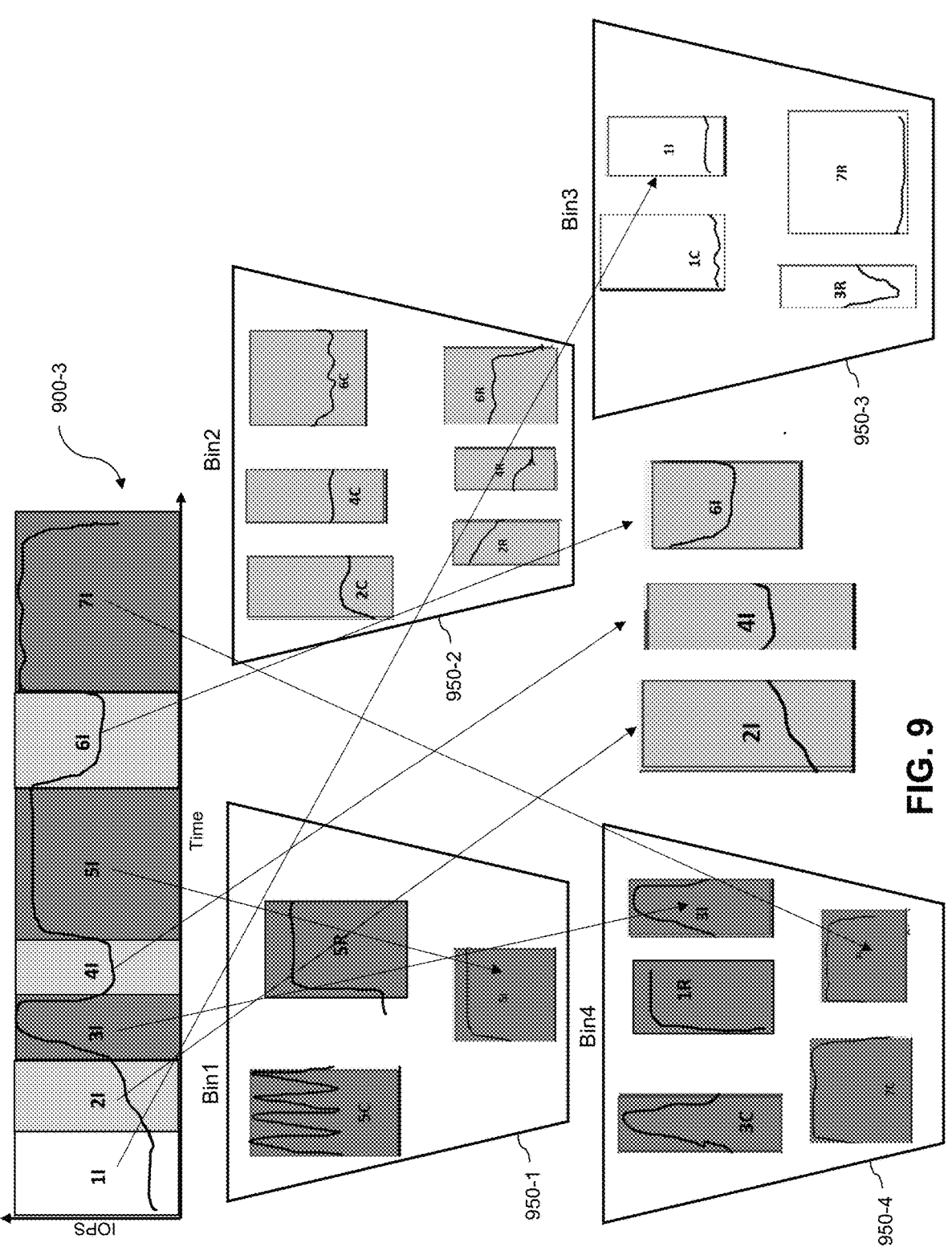
FIG. 9 shows additional processing of partitioned graph data in connection with the example bucketing process in an illustrative embodiment.

FIG. 9 shows additional processing of partitioned graph data in connection with the example bucketing process in an illustrative embodiment. Specifically, FIG. 9 illustrates a continuation of the bucketing process depicted in FIG. 6, FIG. 7, and FIG. 8, processing the third partitioned graph 900-3 pertaining to another storage metric (here, IOPS) and putting various segments into Bin1 950-1, Bin2 950-2, Bin3 950-3, and/or Bin4 950-4, as appropriate, as well as identifying one or more segments (e.g., 2I, 4I, and 6I) which do not initially correspond to one of the existing buckets.

Figure 10:
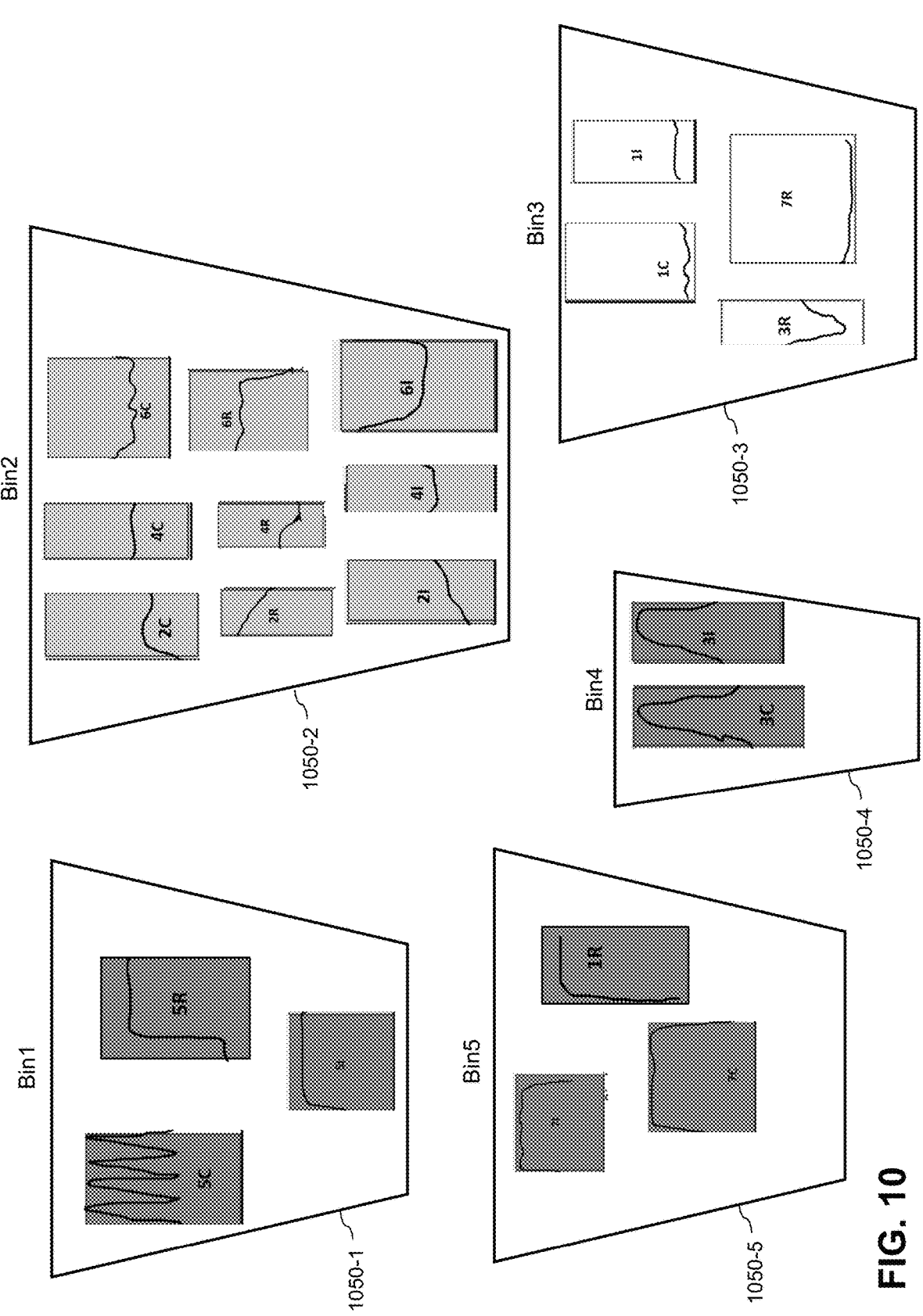
FIG. 10 shows additional processing of partitioned graph data in connection with the example bucketing process in an illustrative embodiment.

FIG. 10 shows additional processing of partitioned graph data in connection with the example bucketing process in an illustrative embodiment. Specifically, FIG. 10 is analogous to FIG. 8, wherein FIG. 10 illustrates, subsequent to the processing detailed in connection with FIG. 9, Bin1 1050-1, Bin2 1050-2, Bin3 1050-3, Bin4 1050-4, and Bin5 1050-5, each with retained similar and/or matching segments therein. Subsequently, one or more embodiments include considering the next and/or remaining storage metric(s), and repeating the above-noted steps accordingly. Additionally, in such an embodiment, each bin or bucket indicates a unique type of workload. For example, Bin1 might correspond to analytics workloads, Bin2 might correspond to database workloads, Bin3 might correspond to transaction workloads, Bin4 might correspond to high-performance computing workloads, and Bin5 might correspond to batch workloads.

Accordingly, using such information and/or determinations, one or more embodiments include building labeled supervised datasets of various workload types, and building and/or training at least one machine learning multi-class classifier algorithm using such labeled supervised datasets.

FIG. 11 is a flow diagram of a process for automatically detecting workload type-related information in storage systems using machine learning techniques in an illustrative embodiment. It is to be understood that this particular process is only an example, and additional or alternative processes can be carried out in other embodiments.

In this embodiment, the process includes steps 1100 through 1112. These steps are assumed to be performed by the storage workload type detection system 105 utilizing its elements 112, 114 and 116.

Step 1100 includes designating multiple workload types associated with at least one storage system, wherein designating the multiple workload types includes identifying one or more performance-related characteristics associated with each of the multiple workload types. In at least one embodiment, the multiple workload types includes at least two of batch workloads, transactional workloads, analytic workloads, high-performance workloads, and database workloads. Additionally or alternatively, the one or more performance-related characteristics can include at least one of input-output mix, input-output type, data-metadata mix, block size distribution, file size distribution, and data efficiency appropriateness.

Step 1102 includes obtaining historical time series data, associated with the at least one storage system, pertaining to multiple performance-related metrics. In one or more embodiments, obtaining historical time series data includes obtaining historical time series data pertaining to multiple performance-related metrics at multiple component levels of the at least one storage system and/or obtaining historical time series data pertaining to multiple performance-related metrics from multiple storage objects, associated with the at least one storage system, that are allocated to at least one of one or more hosts and one or more virtual machines. Additionally or alternatively, the multiple performance-related metrics can include metrics pertaining to two or more of read operations, bandwidth, latency, CPU utilization, input-output size, input-output operations per second, queue, virtual volume latency, requests, packets, bandwidth, read hits, write hits, and free capacity.

Step 1104 includes partitioning at least a portion of the historical time series data into multiple segments based at least in part on value levels of the multiple performance-related metrics. Step 1106 includes generating one or more supervised datasets by associating, for each of the multiple segments, at least a portion of the value levels of the multiple performance-related metrics with a given one of the designated workload types.

Step 1108 includes training at least one machine learning model using at least a portion of the one or more supervised datasets. In at least one embodiment, training the at least one machine learning model includes processing the at least a portion of the one or more supervised datasets using at least one machine learning multi-class classifier algorithm.

Step 1110 includes detecting one or more workload types associated with input data from the at least one storage system by processing at least a portion of the input data using the at least one machine learning model. In one or more embodiments, detecting one or more workload types associated with the input data includes determining that one or more particular storage objects within the at least one storage system are used for one or more of the designated types of workloads.

Step 1112 includes performing one or more automated actions based at least in part on the one or more detected workload types associated with the input data. In at least one embodiment, performing the one or more automated actions includes further training the at least one machine learning model based at least in part on the one or more detected workload types associated with the input data. Additionally or alternatively, as also detailed herein, in one or more embodiments, performing the automated actions can include generating and outputting one or more purchasing and/or obtainment suggestions to at least one user regarding the type of storage system(s) most suitable to the user's usage context. Further, performing the automated actions can also include, for example, automatically balancing workloads within one or more storage systems (e.g., to improve and/or streamline performance of the storage system(s)), as well as generating and outputting one or more suggestions and/or notifications to one or more infrastructure teams or systems to assist in constructing more suitable and/or efficient information technology (IT) infrastructures for future use.

Accordingly, the particular processing operations and other functionality described in conjunction with the flow diagram of FIG. 11 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically detect workload type-related information in storage systems using machine learning techniques. These and other embodiments can effectively overcome problems associated with reduced performance and/or the wasting of resources.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
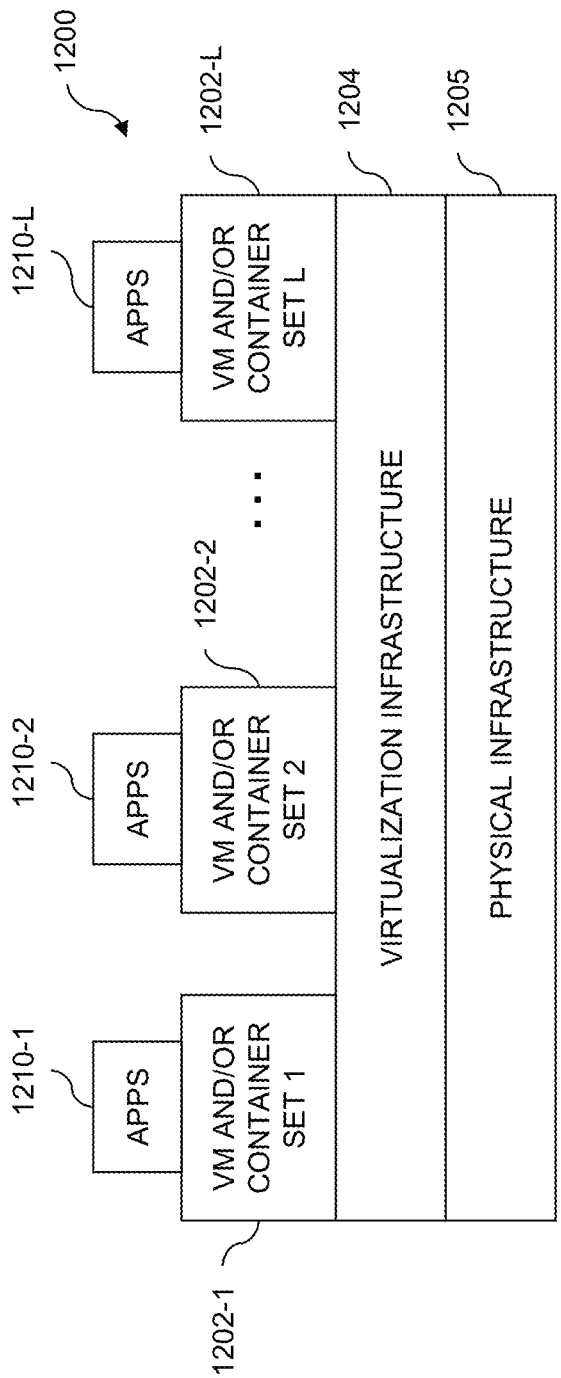
FIGS. 12 and 13 show examples of processing platforms that may be utilized to implement at least a portion of an information processing system in illustrative embodiments.
Figure 13:
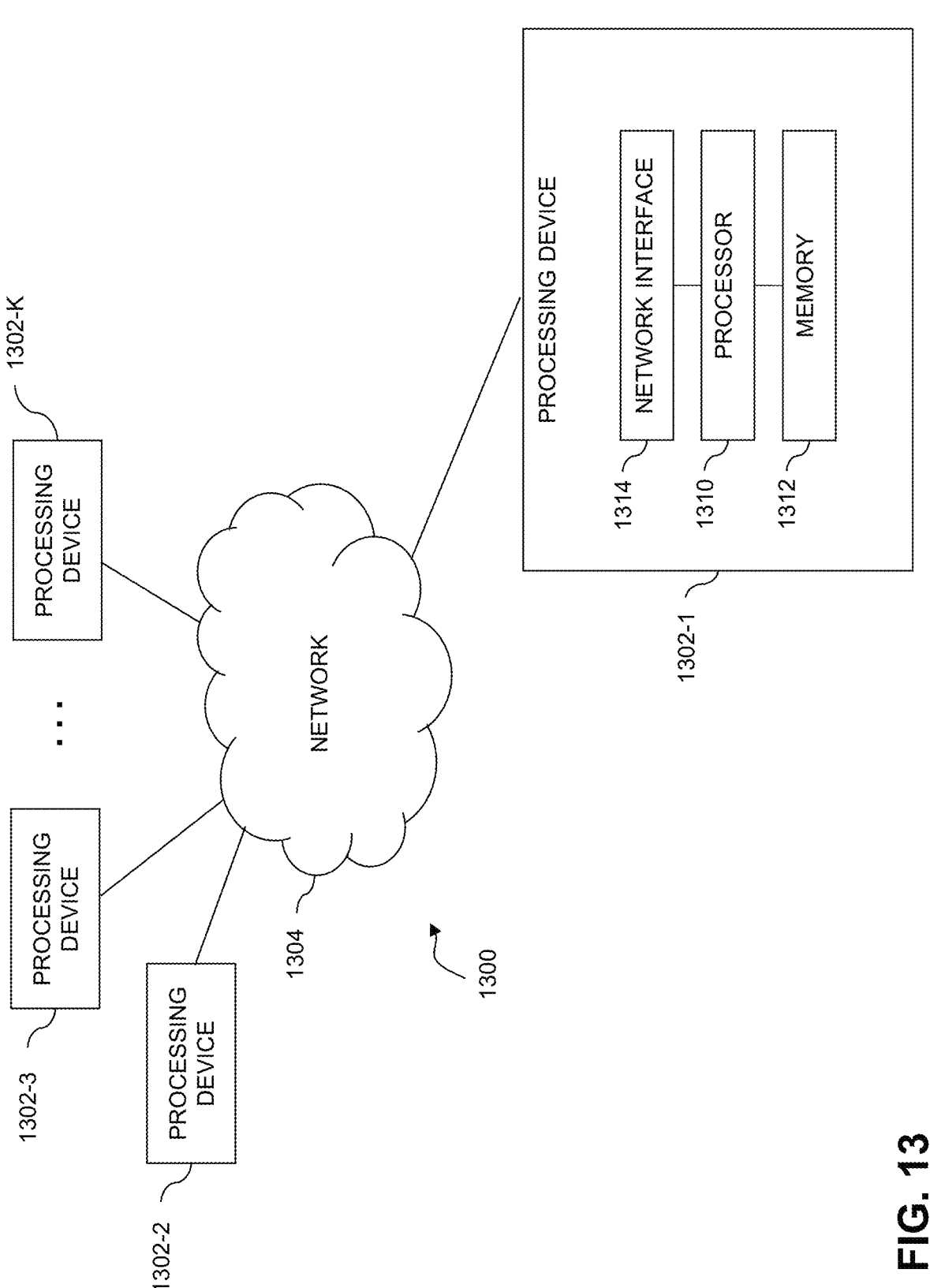

FIG. 12 shows an example processing platform comprising cloud infrastructure 1200. The cloud infrastructure 1200 comprises a combination of physical and virtual processing resources that are utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 comprise respective VMs, respective sets of one or more containers, or respective sets of one or more containers running in VMs. In some implementations of the FIG. 12 embodiment, the VMs/container sets 1202 comprise respective VMs implemented using virtualization infrastructure 1204 that comprises at least one hypervisor.

A hypervisor platform may be used to implement a hypervisor within the virtualization infrastructure 1204, wherein the hypervisor platform has an associated virtual infrastructure management system. The underlying physical machines comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1302-1 in the processing platform 1300 comprises a processor 1310 coupled to a memory 1312.

The processor 1310 comprises a microprocessor, a microcontroller, an application-specific integrated circuit (ASIC), a field-programmable gate array (FPGA) or other type of processing circuitry, as well as portions or combinations of such circuitry elements.

The memory 1312 comprises random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
designating multiple workload types associated with at least one storage system, wherein designating the multiple workload types comprises identifying one or more performance-related characteristics associated with each of the multiple workload types;
obtaining historical time series data, associated with the at least one storage system, pertaining to multiple performance-related metrics;

partitioning at least a portion of the historical time series data into multiple segments based at least in part on value levels of the multiple performance-related metrics;

generating one or more supervised datasets by associating, for each of the multiple segments, at least a portion of the value levels of the multiple performance-related metrics with a given one of the designated workload types;

training at least one machine learning model using at least a portion of the one or more supervised datasets in conjunction with multiple gradient boosted decision trees, wherein the at least one machine learning model comprises at least one gradient boosting model;

detecting one or more workload types associated with input data by processing at least a portion of the input data using the at least one machine learning model; and performing one or more automated actions based at least in part on the one or more detected workload types associated with the input data, wherein performing one or more automated actions comprises:

automatically configuring at least a portion of infrastructure of a given storage system of the at least one storage system by provisioning one or more hardware components suitable for the one or more detected workload types associated with the input data;

further training the at least one machine learning model based at least in part on feedback related to the one or more detected workload types associated with the input data; and automatically balancing one or more workloads associated with the input data across portions of the at least one storage system based at least in part on the one or more detected workload types associated with the input data;

wherein the method is performed by at least one processing device comprising a processor coupled to a memory.

2. The computer-implemented method of claim 1, wherein training the at least one machine learning model comprises processing the at least a portion of the one or more supervised datasets using at least one machine learning multi-class classifier algorithm.

3. The computer-implemented method of claim 1, wherein detecting one or more workload types associated with the input data comprises determining that one or more particular storage objects are used for one or more of the designated types of workloads.

4. The computer-implemented method of claim 1, wherein obtaining historical time series data comprises obtaining historical time series data pertaining to multiple performance-related metrics at multiple component levels of the at least one storage system.

5. The computer-implemented method of claim 1, wherein obtaining historical time series data comprises obtaining historical time series data pertaining to multiple performance-related metrics from multiple storage objects, associated with the at least one storage system, that are allocated to at least one of one or more hosts and one or more virtual machines.

6. The computer-implemented method of claim 1, wherein the multiple workload types comprise at least two of batch workloads, transactional workloads, analytic workloads, high-performance workloads, and database workloads.

7. The computer-implemented method of claim 1, wherein the one or more performance-related characteristics comprise at least one of input-output mix, input-output type, data-metadata mix, block size distribution, file size distribution, and data efficiency appropriateness.

8. The computer-implemented method of claim 1, wherein the multiple performance-related metrics comprise metrics pertaining to two or more of read operations, bandwidth, latency, central processing unit (CPU) utilization, input-output size, input-output operations per second, queue, virtual volume latency, requests, packets, bandwidth, read hits, write hits, and free capacity.

9. A non-transitory processor-readable storage medium having stored therein program code of one or more software programs, wherein the program code when executed by at least one processing device causes the at least one processing device:

to designate multiple workload types associated with at least one storage system, wherein designating the multiple workload types comprises identifying one or more performance-related characteristics associated with each of the multiple workload types;

to obtain historical time series data, associated with the at least one storage system, pertaining to multiple performance-related metrics;

to partition at least a portion of the historical time series data into multiple segments based at least in part on value levels of the multiple performance-related metrics;

to generate one or more supervised datasets by associating, for each of the multiple segments, at least a portion of the value levels of the multiple performance-related metrics with a given one of the designated workload types;

to train at least one machine learning model using at least a portion of the one or more supervised datasets in conjunction with multiple gradient boosted decision trees, wherein the at least one machine learning model comprises at least one gradient boosting model;

to detect one or more workload types associated with input data by processing at least a portion of the input data using the at least one machine learning model; and to perform one or more automated actions based at least in part on the one or more detected workload types associated with the input data, wherein performing one or more automated actions comprises:

automatically configuring at least a portion of infrastructure of a given storage system of the at least one storage system by provisioning one or more hardware components suitable for the one or more detected workload types associated with the input data;

further training the at least one machine learning model based at least in part on feedback related to the one or more detected workload types associated with the input data; and automatically balancing one or more workloads associated with the input data across portions of the at least one storage system based at least in part on the one or more detected workload types associated with the input data.

10. The non-transitory processor-readable storage medium of claim 9, wherein training the at least one machine learning model comprises processing the at least a portion of the one or more supervised datasets using at least one machine learning multi-class classifier algorithm.

11. The non-transitory processor-readable storage medium of claim 9, wherein detecting one or more workload types associated with the input data comprises determining that one or more particular storage objects are used for one or more of the designated types of workloads.

12. The non-transitory processor-readable storage medium of claim 9, wherein obtaining historical time series data comprises obtaining historical time series data pertaining to multiple performance-related metrics at multiple component levels of the at least one storage system.

13. The non-transitory processor-readable storage medium of claim 9, wherein obtaining historical time series data comprises obtaining historical time series data pertaining to multiple performance-related metrics from multiple storage objects, associated with the at least one storage system, that are allocated to at least one of one or more hosts and one or more virtual machines.

14. An apparatus comprising:

at least one processing device comprising a processor coupled to a memory;

the at least one processing device being configured:

to designate multiple workload types associated with at least one storage system, wherein designating the multiple workload types comprises identifying one or more performance-related characteristics associated with each of the multiple workload types;

to obtain historical time series data, associated with the at least one storage system, pertaining to multiple performance-related metrics;

to partition at least a portion of the historical time series data into multiple segments based at least in part on value levels of the multiple performance-related metrics;

to generate one or more supervised datasets by associating, for each of the multiple segments, at least a portion of the value levels of the multiple performance-related metrics with a given one of the designated workload types;

to train at least one machine learning model using at least a portion of the one or more supervised datasets in conjunction with multiple gradient boosted decision trees, wherein the at least one machine learning model comprises at least one gradient boosting model;

to detect one or more workload types associated with input data by processing at least a portion of the input data using the at least one machine learning model; and to perform one or more automated actions based at least in part on the one or more detected workload types associated with the input data, wherein performing one or more automated actions comprises:

automatically configuring at least a portion of infrastructure of a given storage system of the at least one storage system by provisioning one or more hardware components suitable for the one or more detected workload types associated with the input data;

further training the at least one machine learning model based at least in part on feedback related to the one or more detected workload types associated with the input data; and automatically balancing one or more workloads associated with the input data across portions of the at least one storage system based at least in part on the one or more detected workload types associated with the input data.

15. The apparatus of claim 14, wherein training the at least one machine learning model comprises processing the at least a portion of the one or more supervised datasets using at least one machine learning multi-class classifier algorithm.

16. The apparatus of claim 14, wherein detecting one or more workload types associated with the input data comprises determining that one or more particular storage objects are used for one or more of the designated types of workloads.

17. The apparatus of claim 14, wherein obtaining historical time series data comprises obtaining historical time series data pertaining to multiple performance-related metrics at multiple component levels of the at least one storage system.

18. The apparatus of claim 14, wherein obtaining historical time series data comprises obtaining historical time series data pertaining to multiple performance-related metrics from multiple storage objects, associated with the at least one storage system, that are allocated to at least one of one or more hosts and one or more virtual machines.

19. The apparatus of claim 14, wherein the multiple workload types comprise at least two of batch workloads, transactional workloads, analytic workloads, high-performance workloads, and database workloads.

20. The apparatus of claim 14, wherein the one or more performance-related characteristics comprise at least one of input-output mix, input-output type, data-metadata mix, block size distribution, file size distribution, and data efficiency appropriateness.

* * * * *